& Woodward

United States Patent [19]

Hara et al.

[11] 4,233,928
[45] Nov. 18, 1980

[54] INNER BURR CUTTING, INNER FACE CLEANING AND INNER FACE PAINTING APPARATUS FOR LONG PIPES OF SMALL AND MEDIUM DIAMETERS

[75] Inventors: Keiichi Hara; Tomoji Fujisawa, both of Yokohama, Japan

[73] Assignee: Nippon Kokan Kabushiki Kaisha, Tokyo, Japan

[21] Appl. No.: 68,512

[22] Filed: Aug. 22, 1979

[30] Foreign Application Priority Data

Aug. 29, 1978 [JP] Japan .................... 53-105230

[51] Int. Cl.³ .................... B05C 5/00; B05C 7/02
[52] U.S. Cl. .................... 118/35; 118/72; 118/69; 118/306; 118/DIG. 10; 15/104.1 R
[58] Field of Search .................... 118/35, 72, 306, 69, 118/317, DIG. 10; 15/104.1 R, 104.09; 51/411

[56] References Cited

U.S. PATENT DOCUMENTS

| | | | |
|---|---|---|---|
| 1,593,044 | 7/1926 | Stubbs .................... | 15/104.09 X |
| 1,787,126 | 12/1930 | Steinnes .................... | 118/306 |
| 2,033,638 | 3/1936 | Koppl .................... | 15/104.09 X |
| 2,287,825 | 6/1942 | Postlewaite .................... | 118/69 X |
| 3,967,584 | 7/1976 | Hasegawa et al. .................... | 118/72 |

FOREIGN PATENT DOCUMENTS 2000053 1/1979 United Kingdom .................... 118/72

Primary Examiner—John P. McIntosh
Attorney, Agent, or Firm—Frishauf, Holtz, Goodman & Woodward

[57] ABSTRACT

An inner burr cutting, inner face cleaning and inner face painting apparatus for long pressure-welded pipes of medium and small diameters comprises a carriage mounted on a base for reciprocal movement, a supporting tube mounted on the carriage to be inserted into a long pressure-welded pipe of a small or medium diameter, a hollow rotary shaft projecting from the supporting tube, an inner burr cutting device fixed to the rotary shaft, a mechanism for centering the inner burr cutting device in the pressure-welded pipe, a spatter crushing brush, an electromagnet device for attracting spatters and inner burr chips, a spattering prevention device, a paint spraying device disposed ahead of the electromagnet device, and a cooling device surrounding the pressure-welded pipe. After the inner and outer burrs have been removed, the cooling device, spatter crushing device, electromagnet device and paint spraying device are used to clean the inner face of the pressure-welded pipe and paint the portions of the inner face of the pressure-welded pipe from which the inner burrs are removed and which are burnt.

7 Claims, 8 Drawing Figures

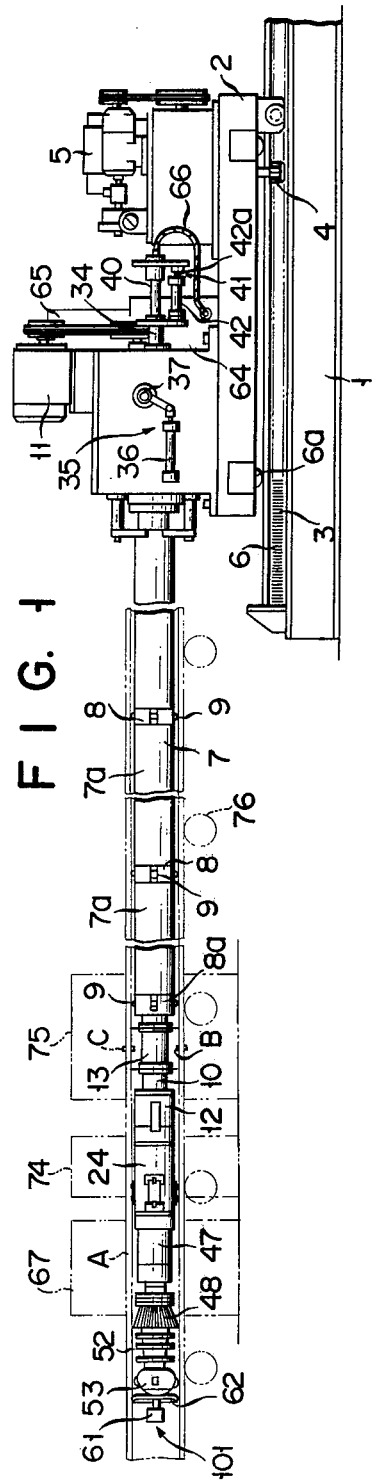
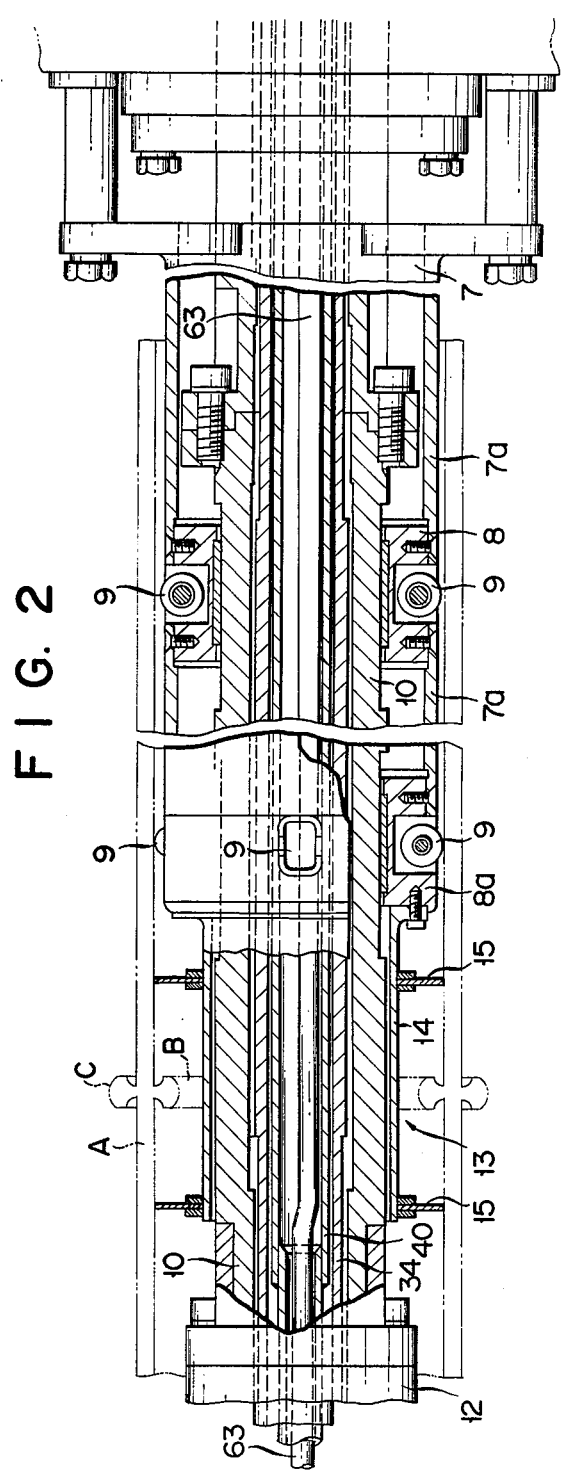

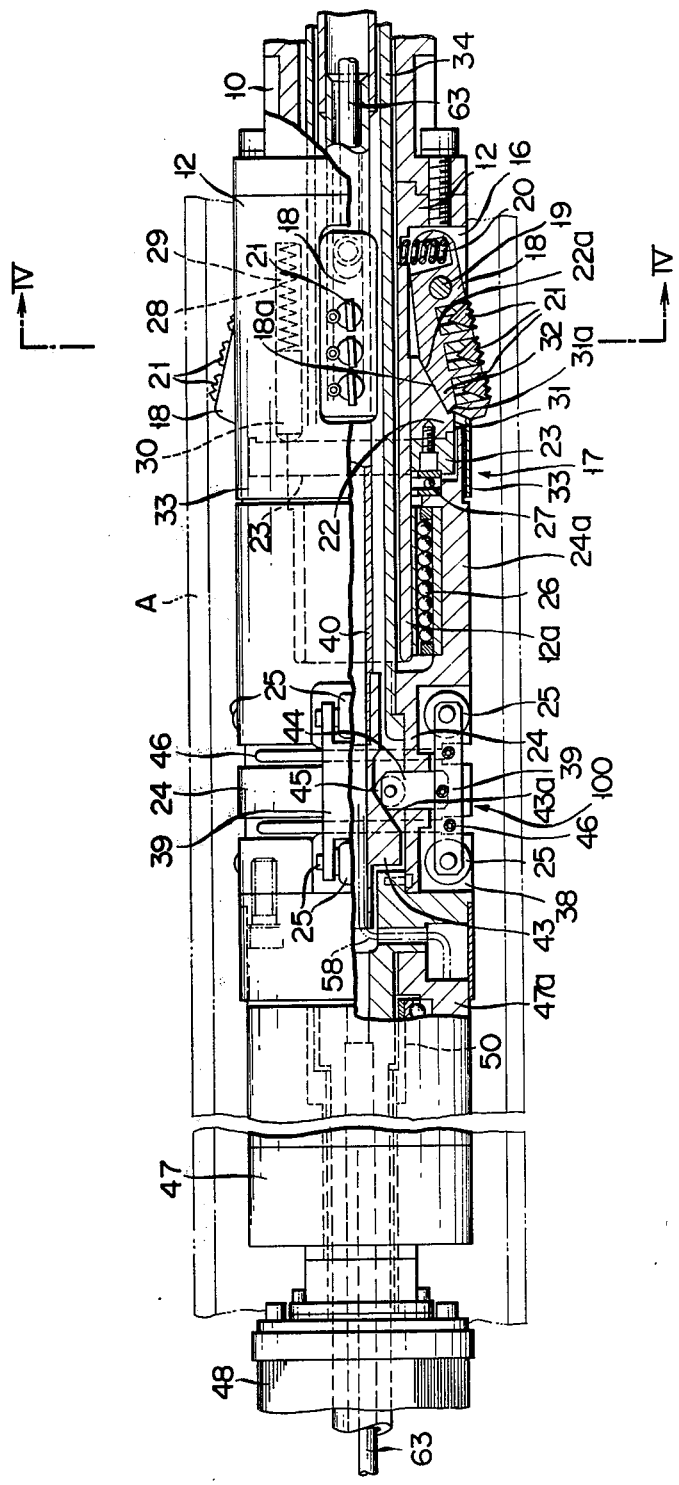

INNER BURR CUTTING, INNER FACE CLEANING AND INNER FACE PAINTING APPARATUS FOR LONG PIPES OF SMALL AND MEDIUM DIAMETERS

BACKGROUND OF THE INVENTION

This invention relates to an inner burr cutting, inner face cleaning and inner face painting apparatus for long pressure-welded pipes of small and medium diameters.

Steel pipes constituting, for example, a submarine or ground pipe line are recently pressure-welded. After pressure-welding, the customary practice is to cut off burrs produced on the inner and outer faces of the junctions of welded pipes. For removal of burrs from the inner faces of pressure-welded pipes, it is necessary first to cut off inner burrs by a cutter or similar tool and then clean the pipe interior by taking off burr chips or spatters produced during cutting or pressure-welding. Particularly, with steel pipes whose inner faces were previously painted, it is necessary to repaint those portions of the inner pipe faces from which burrs were cut off, or where the applied point was damaged by burning resulting from cutting heat or peeled off during the cutting operation.

An automatic inner burr cutting, inner face cleaning and inner face painting apparatus has been used which is provided with rotary cutters, cutter-pushing mechanism, cutter-rotating mechanism, rotary wire brush for cleaning and mechanism for rotating the wire brush. The cutting of inner burrs and the cleaning of the pipe interior have been effected by the single operation of the above-mentioned apparatus. However, such type of apparatus is designed for use with large diameter pipes and is consequently made into too large a size to be applied to long pressure-welded pipes of small and medium diameters.

With long pressure-welded pipes of small and medium diameters, therefore, inner burrs were formerly first cut off by an exclusive burr cutter. Thereafter, the pipe interior was cleaned by an exclusive cleaner. Consequently, the operation of cutting off inner burrs and cleaning the pipe interior failed to be carried out with high efficiency.

An exclusive inner burr cutter proposed to date is the type, wherein a shaft fitted with cutters at the forward end is inserted into long pressure-welded pipes of small and medium diameters; and while being rotated by an external drive mechanism, the shaft is axially moved to cut off inner burrs. With this type of inner burr cutter, there is the great possibility that while the shaft is taken into and out of pipes, the cutters fitted to the shaft strike against the inner faces of the pipes, probably resulting in the damage thereof. Where, therefore, the proposed inner burr cutter is applied to pipes whose inner faces were previously painted, it is necessary to repaint those portions of the pipe inner walls from which inner burrs were cut off, or which were damaged by the cutters fitted to the shaft. Consequently, a separate painting apparatus must be provided to repaint inner pipe faces. This repainting process not only reduces the overall efficiency of the inner pipe face-treating operation, but also is encountered with great difficulties due to the considerable length and relatively limited diameters of pipes being treated. After all, the above-mentioned exclusive inner burr cutter fails to be applied to long pressure-welded pipes of small and medium diameters whose inner faces were previously painted.

Further, a proposed exclusive cleaner for the inner faces of long pipes of small and medium diameters can not carry out efficient cleaning due to the great length and relatively limited diameters of pipes being treated, failing to fully clear inner pipe walls of burr chips and spatters.

Moreover, no measures have hitherto been taken to reduce the heat generated at the cutting of inner burrs and ensure the reliable repaint of the portions of inner pipe faces from which burrs were cut off.

The object of this invention is to provide an inner burr cutting, inner face cleaning and inner face painting apparatus for long pressure-welded pipes of small and medium diameters which carries out all these processes by a single operation.

SUMMARY OF THE INVENTION

According to this invention, there is provided an inner burr cutting, inner surface cleaning and inner face painting apparatus comprising a base, a carriage mounted on the base and reciprocable along a long pressure-welded pipe of medium and small diameters, a supporting tube supported at one end thereof by the carriage and inserted into the pipe having an inner burr produced on an inner surface thereof, a first motor mounted on the carriage, a rotary shaft coaxially inserted into the supporting tube, having one end protruding from the other end of the supporting tube and rotated at the other end by the first motor, an inner burr cutting device fixedly mounted on the rotary shaft for cutting off the inner burr, sets of rollers, the rollers of each of said sets being arranged circumferentially on an outer periphery of the supporting tube for contacting the inner surface of the pipe, a centering device disposed at the other end of the supporting tube for centering the cutting device in the pipe, a second motor mounted on the centering device and provided with a drive shaft coaxial with the rotary shaft, a spatter crushing device driven by the drive shaft, an electromagnet device provided at either the forward end or rear end of the spatter crushing device, a spattering prevention device disposed between the inner burr-cutting device and said other end of the supporting tube, a paint spraying device set in front of the electromagnet device to spray paint on the inner faces of pressure-welded pipes, and a cooling device surrounding the pressure-welded portions of pressure-welded pipes for cooling the pressure-welded portions.

The above-mentioned apparatus embodying this invention carries out the cutting-off of burrs from the inner surfaces of long pressure-welded pipes of medium and small diameters, the crushing of spatters and the removal of burr chips and spatters from the pipe interior all at once. Further, the present apparatus can cut off burrs produced on the inner surfaces of pressure-welded pipes without damaging a painted layer, even if it is applied on the inner surfaces.

BRIEF DESCRIPTION OF THE DRAWINGS

This invention can be fully understood from the following detailed description with reference to the accompanying drawings in which:

FIG. 1 is a front elevational view of an apparatus embodying this invention;

FIG. 2 is a longitudinal sectional view of part of FIG. 1, showing a spattering prevention device and guide rollers;

FIG. 3 shows a longitudinal sectional view of part of FIG. 1, showing an inner burr cutting device and a centering device;

DETAILED DESCRIPTION

Figure 4:
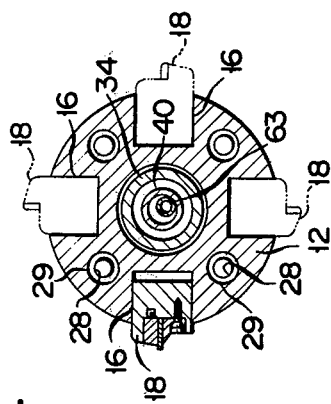
FIG. 4 is a cross sectional view along line IV—IV of FIG. 3.

Referring to FIG. 1, a carriage 2 can travel on rails 6 laid on a base 1 by means of wheels 6a along a long pressure-welded steel pipe A which has a medium or small diameter, a length of 6 to 12 meters and an outer diameter of 6 to 16 inches. The carriage 2 is provided with a pinion 4 engaged with a rack 3 provided on the lateral side of each rail 6, and an electric motor 5 for rotating the pinions 4. The carriage 2 can travel on the rails 6 by the rotation of the pinions 4. A horizontally extended supporting tube 7 is supported at its rear end by the carriage 2 and is inserted into the steel pipe A by the travel of the carriage 2.

Referring to FIGS. 1 and 2, the supporting tube 7 comprises a tube elements 7a, connecting rings 8 for connecting together the corresponding ends of the adjacent tube elements 7a and a forward ring 8a having the same construction as the connecting rings 8 provided on the forward end of the supporting tube 7. A plurality of guide rollers 9 are arranged on the rings 8, 8a in a circumferentially equally spaced relation and make rolling contact with the inner surface of the pressure-welded pipe A.

A hollow rotary shaft 10 is supported in the supporting tube 7 by the rings 8, 8a acting as bearings, and is driven by an electric motor 11 mounted on the carriage 2, with a belt stretched between the pulleys mounted on the rear end of the rotary shaft 10 and the driving shaft of the motor 11. The forward end of the rotary shaft 10 protrudes outward from the forward end of the supporting tube 7 and is fitted with a hollow cylindrical burr cutter head for inner burr cutting device 12.

As shown in FIG. 2, a device 13 for preventing spatters from scattering when pipe elements are pressure-welded into a steel pipe A (hereinafter referred to as the "spattering prevention device") is provided between the forward end of the supporting tube 7 and the cutter head 12. This spattering prevention device 13 comprises a tubular member 14 whose rear end is fixed to the forward end of the forward ring 8a to loosely support the rotary shaft 10 and a pair of elastic, noninflammable annular plates 15 made of, for example, glass wool. The inner peripheral edge of each annular plate 15 is fixed to the outer peripheral surfaces of the tubular member 14 at both ends thereof. The outer peripheral surface of the annular plate 15 slidably contacts the inner surface of the pressure-welded pipe A.

Referring to FIGS. 3 and 4, the cutter head 12 comprises lengthwise extending grooves 16 circumferentially equidistantly formed in the periphery of the cutter head 12, and cutter holders 18 slidably fitted into the respective grooves 16 to extend lengthwise of the cutter head 12. The rear end portion of each cutter holder 18 (which is nearer to the spattering prevention device 13) is rotatably supported on the cutter head 12 by means of a pivot 19 such that the cutter holder 18 can rock radially of the cutter head 12. A compression coil spring 20 urges the respective cutter holder 18 to retract it into the groove 16. Cutters or cutter tips 21 are interchangeably mounted into the cutter holder 18 in series. When the cutter holder 18 is rotated against the spring 20, those of cutters 21 which are set nearer to the forward end side of the cutter holder 18 more closely approach the inner surface of the pipe A.

The cutter holder pusher 17 comprises, as shown in FIG. 3, a cutter holder-pushing tapered member 22 which is received in the groove 16 and reciprocates lengthwise of the cutter holder 18; a slide ring 23 which is loosely mounted on the outer periphery of a tubular portion 12a protruding from the forward end of the cutter holder 18; and a hollow cylindrical pushing member 24a for forcefully shifting the slide ring 23 toward the cutter holder 18. The pushing member 24a is integrally formed with a support 24 of the later described centering rollers 25 and surrounds the tubular member 12a so as to be supported on the outer periphery of the tubular member 12a by means of a ball bearing 26 concurrently used for the slide and rotation of the pushing member 24a. The rear end of the pushing member 24a abuts against the forward end of the slide ring 23 rotated with the cutter head 12 through a ball bearing 17 by compression springs 28 (only one being shown in FIG. 3) placed in blind holes 29 (only one being shown in FIG. 3) in the cutter head 12. Each compression spring 28 elastically presses the slide ring 23 forward by means of a slide pin 30 in the respective blind hole 29. A stop portion 31 is formed at the terminal or outermost end portion of a tapered surface 22a of the tapered member 22. The stop portion 31 has a groove 31a with which a projecting engagement portion 32 formed at the forward end of the cutter holder 18 is made engageable. At the time of the engagement, the cutter holder 18 is rotated outward in the radial direction of the cutter head 12 to a maximum extend, a condition in which the foremost cutter 21 approaches the inner surface of the pressure-welded pipe A at an extremely small interval of, for example, one millimeter. Formed on the forward inner face of the cutter holder is a tapered face 18a complementary to the tapered surface 22a of the tapered member 22 for engagement therewith. The stop portion 31 acts to push the engagement portion 32 in a direction opposite to that in which the cutter holder 18 is forced.

A hollow cylindrical protective cover 33 surrounds the forward end portion of the cutter head 12 so as to close an area around the forward end of the cutter holder 18 and the peripheral section of the space through which the tapered member 22 is shifted. The protective cover 33 prevents burr chips from being carried into a space defined between the stop portion 31 and engagement portion 32 and also into a space defined between the cutter holder 18 and tapered member 22.

A tubular cutter head pushing rod 34 passes through the rotary shaft 10 and cutter head 12, and is reciprocable therethrough by a drive mechanism 35 (FIG. 1) mounted on the carriage 2. But the tube 34 is not rotated. The forward end of the cutter head pushing rod 34 projects from the tubular member 12a of the head 12, and is fixed by the centering roller support 24 integrally formed with the pushing member 24a.

Referring FIG. 1, the drive mechanism 35 for reciprocating the tubular cutter head pushing rod 34 comprises a hydraulic piston-cylinder assembly 36 mounted on the carriage 2; a swingable link 37 swung by the hydraulic piston-cylinder assembly 36; and a mechanism (not shown) such as a worm gearing to transmit the swing force of the swingable link 37 to the cutter-pushing rod 34 for its reciprocation.

When inner burrs B (FIG. 1) begin to be cut off, the cutter head pushing rod 34 is moved toward the carriage 2 by the action of the piston-cylinder assembly 36. This movement causes the tapered member 22 to be forced rearward of the cutter holder 18 by means of the pushing member 24a and the ball bearing 27. The cutter holder 18 is pushed outward in the radial direction of the cutter head 12 until the engagement portion 32 of the cutter holder 18 is fitted into the groove 31a of the stop portion 31.

As the piston-cylinder assembly 36 is operated in the opposite direction to the preceding case, the cutter head pushing rod 34 and pushing member 24a are brought back to the original position, and the tapered member 22 is returned to the original position by means of the springs 28. As a result, the cutter holder 18 is moved back into the recess 16 by the compression spring 20. The cutter holder 18 is retracted into the recess 16 (FIGS. 3 and 4), except when inner burrs B are cut off. Each of centering roller chambers 38 circumferentially equidistantly provided in the outer peripheral surface of the centering roller support 24 contains a centering roller support frame 39 which is movable toward and from the inner surface of the pipe A. At least the outer peripheral surface portion of the centering rollers 25 is made of soft material such as copper or hard polyurethane resin which is little likely to abrade a painting on the inner face of the pipe A. The centering rollers 25 are supported on both ends of the centering roller support frame 39.

Referring again to FIG. 1, a centering roller pushing rod 40 is inserted into the cutter head pushing rod 34 and is reciprocated along the pressure-welded pipe A by a drive mechanism 41 mounted on the carriage 2. As shown in FIG. 1, the drive mechanism 41 comprises a hydraulic cylinder 42 with the forward end fixed to the rear end of the cutter head pushing rod 34 and a piston rod 42a reciprocatingly inserted into the cylinder 42 whose rear end is fixed to the rear end of the centering roller pushing rod 40 protruding from the free end of the cutter head pushing rod 34.

Referring to FIG. 3, a centering mechanism 100 for pressing the centering rollers 25 against the inner surface of the pipe A comprises a hollow cylindrical centering tapered member 43 having the rear end coaxially connected to the forward end of the pushing rod 40 and formed with a conical surface 43a with its diameter increased toward the forward end of the tapered member 43; sliding member 44 disposed in the respective roller chambers 38 and adapted to be radially slidable in the support 24; and inner rollers (or guiding rollers) 45 supported on the inner ends of the respective sliding members 44. The outer end of each of the sliding members 44 is fixed by the centering roller support frame 39. Each inner roller 45 is normally elastically pressed against the conical surface 43a of the tapered member 43 by coil spring bands 46 allowing for the retraction of centering rollers 25 into the roller chambers 38. In other words, the coil spring bands 46 surround the centering roller support 24 and pass through the support frame 39 such that they elastically press the centering roller supports 39 toward the tapered member 43.

Before the centering rollers 25 are inserted into the pressure-welded pipe A, the centering roller pushing rod 40 is pushed in the extremely forward position, thereby causing the centering rollers 25 to be retracted into the centering roller chambers 38. Where the centering roller pushing rod 40 is moved rearward and consequently the centering tapered member 43 is moved in the same direction as the centering roller pushing rod 40, the centering mechanism 100 causes the centering rollers 25 to be moved radially outward of the centering roller support 24 for abutment against the inner surface of the pipe A.

The rearward movement of the centering roller pushing rod 40 is effected by actuating the hydraulic piston-cylinder assembly 42–42a before the tapered member 22 is pulled in the same direction as that in which the rearward movement is carried out. Accordingly, the centering rollers 25 are pressed against the inner surface of the pipe A before the cutter holders 18 are pushed radially outward of the cutter head 12. Thereafter, the centering roller pushing rod 40, an assembly of the centering roller support 24, pushing member 24a and tapered member 22 and cylinder 42 are pulled in a body toward the carriage 2 by actuating the piston-cylinder assembly 36. As a result, the cutter holder 18 can progressively come out of the cutter head 12, with the centering rollers 25 pressed against the inner surface of the pipe A.

Figure 5:
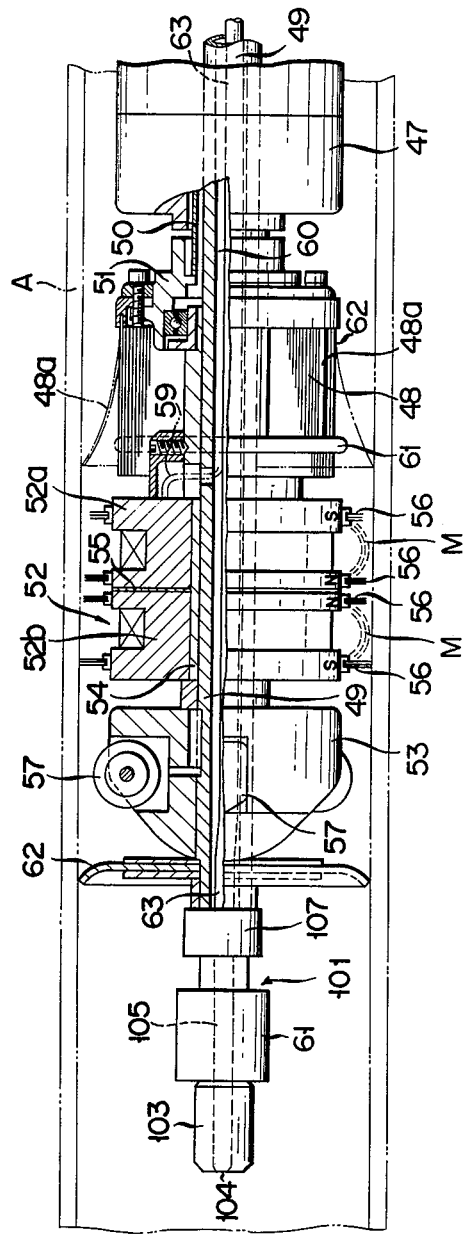
FIG. 5 shows a longitudinal sectional view of part of FIG. 1, showing a spatter crushing device, an electromagnet device and a paint spraying device.

As shown in FIGS. 3 and 5, a rotary wire brush 48 is rotated by a wire brush driving electric motor 47 set ahead of the centering mechanism 100. The motor 47 has a hollow cylindrical shaft 50. A long support shaft 49 coaxially extends from the forward end of the centering roller support 24 with its rear end fixed to the support 24. The body 47a of the motor 47 fixedly mounted on the support shaft 49 such that the shaft 49 coaxially passes the motor shaft 50. The wire brush 48 is formed by bundling a large number of metal wires 48a, for example, iron or steel wires. The rear end of the wire brush 48 is fixed to a ring-shaped rotary frame 51 fixedly mounted on the forward end portion of the motor shaft 50. When the wire brush 48 is rotated by the motor 47, the forward end of the wire brush 48 is expanded by a centrifugal force resulting from the rotation of the motor shaft 50, and forward free ends of the brush wires 48a strike the inner face of the pipe A for brushing it as indicated by chain lines in FIG. 2. As more frequently applied, the wire brush 48 is more likely to remain expanded, probably presenting difficulties in the insertion of the wire brush 48. To avoid such difficulties, the forward end portion of the wire brush 48 is wound with a weak spring band 61, which, when a centrifugal force is applied to the wire brush 48, does not obstruct its expansion, but in the absence of the centrifugal force, lets the wire brush 48 regain its original cylindrical form. The spring band 61 is fastened to the rotary frame 51 by connecting wires 62 to be prevented from coming off.

Set ahead of the wire brush 48 is a chip and spatter attracting electromagnet device 52, in front of which (that is, at the foremost end of the burr-cutting apparatus) a foremost end guide member 53 is provided. The electromagnet device 52 and guide member 53 are loosely inserted into the support shaft 49 protruding ahead of the wire brush 48. The electromagnet device 52 is formed by connecting pairs of, for example, D.C. electromagnets 52a, 52b each having a magnetic flux density of about 5,000 Gausses in the axial direction of the support shaft 49 with a magnetic insulation board 55 interposed between the respective paired electromagnets 52a, 52b. The respective paired electromagnets 52a, 52b are fixed to the outer surface of the support shaft 49 with a magnetic insulation hollow cylindrical member 54 interposed between the paired electromagnets 52a, 52b on one hand and the outer surface of the support shaft 49 on the other. The same poles (for example, N poles) of the electromagnets 52a, 52b are set closely adjacent to each other, thereby preventing magnetic lines M produced by the respective paired electromagnets 52a, 52b from interfering with each other. In addition, the electromagnets 52a, 52b project radially or swelled radially. Thus the electromagnet device 52 can attract burr chips and spatters over a broad area.

A wire brush 56 is projectively provided on the outer periphery of each of the pole portions of the electromagnets 52a, 52b to elevate the burr chip and spatter attracting efficiency of the electromagnet assembly 52. In this case, those of the wire brushes 56 which are set more forward protrude from said pole portions at progressivly greater lengths. The foremost wire brush 56 has a sufficiently great length to face the inner face of the pipe A at an extremely small interval such as one millimeter. Provided on the peripheral surface of the foremost end guide member 53 are guide rollers 57 whose peripheral surface projects from a surface flush with the peripheral surface of the electromagnets 52a, 52b. The guide rollers 57 prevent the electromagnets 52a, 52b from being magnetically attracted to the inner surface of the stell pipe A, when the electromagnet device 52 absorbs burr chips and spatters. Even if the wire brush 56 is magnetically attracted to the inner surface of the pipe A, the attracting force is weak. Moreover, the wire brush 56 moves along the inner surface of the pipe A while being elastically deformed. Therefore, it is unnecessary to provide an arrangement to prevent the wire brush 56 from being magnetically attracted to the inner surface of the pipe A.

Referring to FIG. 3, the wire brush-driving motor 47 is connected to an electric power supply cable 58 (FIG. 3). The electromagnet device 52 is connected to another electric power supply cable 59 (FIG. 5). The electric power supply cables 58, 59 are inserted into a hollow centering roller pushing rod 40 and the support shaft 49, respectively. The electric power supply cable 59 connected to the electromagnet device 52 runs through a cable passage 60 provided in the support shaft 49. The rear ends of the electric power supply cables 59, 60 are connected to an electric power supply device (not shown) mounted on the carriage 2.

Two long pipe elements of a medium or small diameter are first aligned end to end before they are pressure-welded. The above-mentioned tube received section is inserted into the aligned pipe elements. Upon completion of the pressure-welding of the pipe elements into a pressure-welded pipe A, the tube-received section is pulled out of the pressure-welded pipes A, while cutting off inner burrs B (that is, burrs B produced on the inner surface of the pressure-welded portions of the pipe A), followed by the sweeping of burr chips and spatters from the pipe interior.

Mounted on the carriage 2 are a paint reservoir 65 for holding paint made of such as coal tar expoxy series resin and a high pressure airless paint feeding pump 64 (operated at a pressure of 150 to 180 Kg/cm$^2$) for forcefully feeding the paint to the later described paint spraying device 101 connected to the reservoir 65.

The paint spraying device 101 comprises a cylindrical paint sprayer head 61 and a solenoid valve 107 provided in series at the forward end of the hollow support shaft 49, and a paint feeding pipe 63 which penetrates the hollow support shaft 49 and hollow centering roller pushing rod 40, one end of which is connected through the solenoid valve 107 to the rear end of the paint sprayer head 61 and the other end of which is connected to a pump 64 by means of a flexible pipe 66. A flexible pipe 66 is easily bent and striaghtened so as to be used to feed paint to the paint spraying device 101 without obstruction, while the centering roller pushing rod 40 is moving relative to the pump 64.

Figure 6:
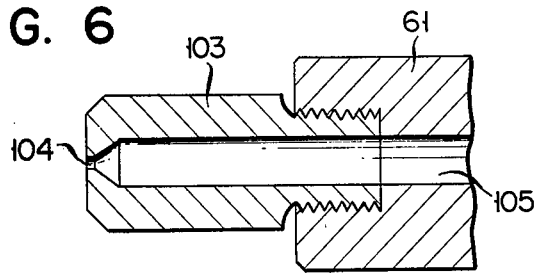
FIG. 6 is a longitudinal sectional view of a head of a paint-spraying device according to the invention.
Figure 7:
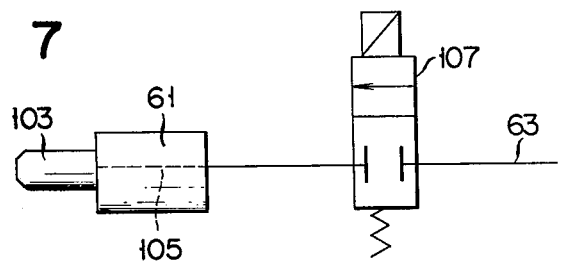
FIG. 7 is a hydraulic circuit of the paint spraying system.

As seen from FIGS. 6 and 7 the paint sprayer head 61 has a central nozzle 103 with a nozzle orifice 104. The rear end of the nozzle 103 and said other end of the paint-feeding pipe 63 are connected together by a connection pipe 105.

When the paint spraying head 61 reaches a portion of the inner surface of the pressure-welded pipe A which is to be painted, the solenoid valve 107 is actuated to allow the nozzle 103 to spray paint onto said portion over its entire circumference.

The provision of the solenoid valve 107 near the forward end of the feeding pipe 63 applies such a high pressure to paint in the forward end of the feeding pipe 63 that the nozzle 103 sprays paint onto the inner face of the pressure-welded pipe A immediately after the solenoid valve 107 is opened. Accordingly, the paint spraying efficiency is much enhanced.

Set at the forward end of the support shaft 49 is a disc screen 62 which is made of elastic uninflammable material like glass wool impreganted with silicone resin and whose outer diameter is made slightly longer by, for example, 5 mm than the inner diameter of the pressure-welded pipe A. The periphery of the disc screen 62 is elastically pressed against the inner face of the pressure-welded pipe A, thereby preventing a sprayed paint ejected through the nozzles 103 and the volatile component of said sprayed paint from settling on the electromagnet device 52 and wire brush 48.

Figure 8:
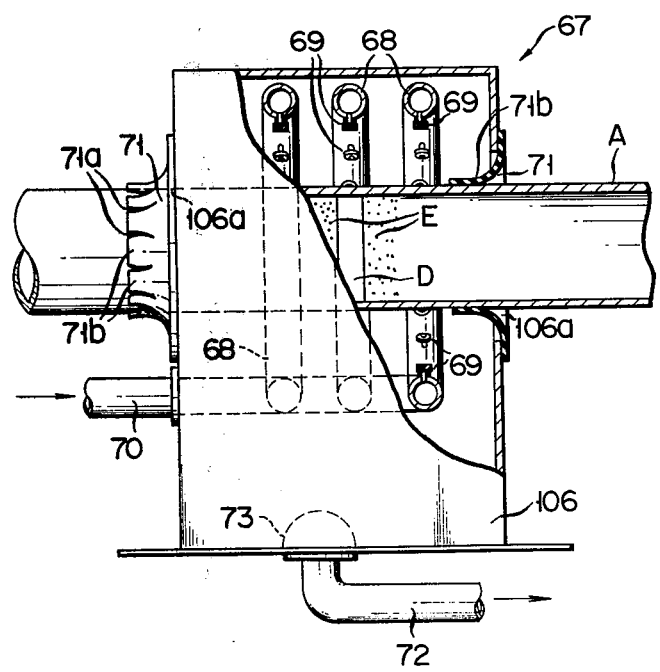
FIG. 8 is a fractional exploded view of the cooling device according to this invention.

As shown in FIG. 1, the pressure-welded portion of the pipe A is forcefully cooled from the outside after the cutting of inner and outer burrs by means of a cooling device 67 having said pressure-welded portion inserted thereinto. As seen from FIG. 8, the cooling device 67 comprises a housing 106 into which the pressure-welded pipe A is inserted and a plurality of ring-shaped cooling pipes 68 which are so arranged in the housing 106 as to surround to pressure-welded portion of the pressure-welded pipe A. A plurality of cooling water stray nozzles 69 are equidistantly provided on the inner wall of each cooling pipe 68. High pressure cooling water having a pressure of such as 1 to 2 atms. (gauge pressure) at a feeding rate of 10 liters/min is supplied from a cooling water source (not shown) to the cooling pipe 68 through a cooling water feed pipe 70, and ejected through the nozzles 69 to quickly cool the pressure-welded portion of the pressure-welded pipe A. The cooling water collected at the bottom of the housing 106 is drawn off through a strainer 73 provided at the floor of the housing 106 and drain pipe 72.

Provided on the front and back sides of the housing 106 are ring-shaped water baffle boards 71 to close the openings 106a of the housing 106 through which the pressure-welded pipe A passes. The water baffle boards 71 are each made of flexible material like rubber and provided with a large number of notches 71a radially extending from the inner peripheral edge to define fins 71b. The inner periphery of the water baffle board 71 has a smaller diameter than the outer diameter of the pressure-walded pipe A. When the pressure-welded pipe A is inserted into the housing 106 through the openings 106a, the fins 71b of the water haffle board 71 are elastically pressed against the outer peripheral surface of the pressure-welded pipe A to prevent water from leaking out of the housing 106.

Referring again to FIG. 1, an outer burr cutting device 74 is set adjacent to the cooling device 67 as counted from the side of the carriage 2. A flash butt welding machine 75 is disposed adjacent to the outer burr-cutting device 74 similarly as counted from the side of the carriage 2. For convenience of description, the section of the apparatus which is defined between the rear end of the supporting tube 7 and the foremost end guide member 53 is generally referred to as a tube-received section.

In operation, the tube-received section is inserted into the aligned pipe elements to be pressure-welded by letting the carriage 2 travel forward, with the cutter holder 18 and centering rollers 25 retracted. The carriage 2 is brought to rest, with the end-to-end abutting sections of the aligned pipe elements set between both elastic annular plates 15 of the spattering prevention device 13. The tube-received section is inserted into the end-to-end aligned pipe elements at a relatively high speed. Since, however, the cutter holders 18 remain retracted, even a painting applied on the inner surface of the aligned pipe elements is not damaged at the time of said insertion. After inserted into the aligned pipe elements, the centering rollers 25 are moved by the actuation of the piston-cylinder assembly 42-42a to lightly touch the inner surface of the aligned pipe elements. The end-to-end abutting sections of the aligned pipe elements are pressure-welded, after the insertion of the tube-received section is is brought to an end. Spatters resulting from the pressure-welding of the aligned pipe elements are prevented from being spattered through the pipe A thus pressure-welded over a wide area by means of the spattering prevention device 13. After the pressure-welding of the pipe elements, the piston-cylinder assembly 42-42a is further actuated to tightly press the centering rollers 25 against the inner surface of the pressure-welded pipe A thereby ensuring the centering of the tube received section. After the centering is effected, the piston-cylinder assembly 36 is actuated to push the cutter holders 18 radially outward of the cutter head 12 to a maximum extent such that the foremost cutters 21 approach the inner surface of the pressure-welded pipes A. Cutting of an inner burr B which is produced on the inner surface of the pressure-welded pipes A is started by causing the carriage 2 to run backward at a low speed, while the cutter head 12 is rotated due to the rotation of the rotary shaft 10 driven by the motor 11. Since the cutter holders 18 are set by the tapered member 22 in an inclined position to the inner surface of the pressure-welded pipe A as shown in FIG. 3, the cutters 21 nearer to the forward end of each holder 18 approach the inner surface of the pipe A more closely. As the tube received section is retracted, the rear cutters remove the innermost portion of the inner burr B is first. Then, the intermediate cutters cut off the inermediate portion of the burr B, and finally the forward cutters take off the remaining portion of the burr B. Accordingly, the inner burr B is successively and smoothly removed by all the cutters 21. The shifting of the cutter head 12 at the time of the cutting of the inner burr B may be effected by retracting only the rotary shaft 10 and drive means thereof through a proper mechanism (for example, a screw shaft), with the carriage 2 kept at rest.

Upon completion of the cutting of the inner burr B, the piston-cylinder assembly 36 is actuated to retract the cutter holders 18 into the grooves 16 of the cutter head 12. The piston-cylinder assembly 42-42a is actuated slightly backward to loose the pressing force of the centering rollers 25 applied to the inner surface of the pipe A. Thereafter, the carriage 2 is retracted at a slightly increased speed. Power is supplied to the wire brush-driving motor 47 and electromagnet device 52 to start the cleaning of the inerior of the pipe A in which the cutting of burr has been brought to an end. Said cleaning is effected by driving the motor 47 to rotate the wire brush 48, crushing inner burr chips and spatters by the brush wires 48a which is pressed against the inner surface of the pipe A while being rotated due to the centrifugal force applied to the brush, and thereafter absorbing crushed burr chips and spatters by the electromagnet device 52. The cleaning of the pipe interior by the wire brush 48 is brougth to an end at a proper time. However, the adsorption of crushed burr chips and spatters by the electromagnet device 52 is continued, until the tube-received section is pulled out of the pipe A. After pulling out the tube-received section, the supply of the direct electric current is interrupted to the electromagnet device 52, and then reverse direct electric current is supplied thereto for a predetermined time, for example, 2 to 3 seconds such that a reverse magnetic field is generated around the electromagnet device 52 to remove the chips and spatters therefrom.

While the pipe interior is cleaned by brushing dust after the cutting of inner burrs B, a roller conveyor 76 is operated to move the pressure-welded pipe A away from the carriage 2. During this movement of the pipe A, outer burrs C are cut off by the outer burr-cutting device 73. Thereafter, when the pressure-welded portion of the pipe A is moved to the central portion of the cooling device 67, the pipe A is brought to rest. During the movement of the pipe A, the backward travel of the carriage 2 is temporarily stopped.

The welded portion of the pipe A is cooled, as soon as it enters the cooling device 67, by cooling water ejected from the nozzles 69 to a proper temperature for a paint (a lower temperature than 40° C., in case the paint is of the coal tar epoxy series resin). Said proper temperature is defined by estimating the temperature of the pipe inner face from that of the pipe outer surface which is determined by a contact thermometer. After the cooling, the ejection of cooling water is stopped, and the carriage 2 begins to run backward. When drawn near the pressure-welded portion of the pipe A, the solenoid valve 107 is opened, and the paint sprayer head 61 begins to spray paint whose pressure is elevaled beforehand in the forward end of the feeding pipe 63 all over the inner face of the pipe A. While passing along the pressure-welded portion of the pipe A, the paint sprayer head 61 paints those portions D of the inner face of the pipe A from which burrs were cut off and those portions E (FIG. 8) of the inner face of the pipe A lying on both sides of said burr-removed portions D which were damaged by burning. After the stop of paint spray, the electromagnet device 52 removes inner burr chips and spatters while running, through the pressure-welded pipe A.

According to the foregoing embodiment, the centering rollers 25 were pushed forward by the centering roller-pushing rod 40, utilizing its tapered surface. However, the pushing of the centering rollers 25 need not be effected exclusively by the above-mentioned process. Further, the tube-received section was inserted into the pipe A before it was pressure-welded. However, said insertion may be carried out after the pressure-welding of the pipe A. In this case, the tube-received section need not be provided with the spattering prevention device 13. According to the foregoing embodiment, the wire brush 48 was used to crush spatters. However, the wire brush 48 may be replaced by a wire rope, a chain or a wire whose leading end is fitted with a weight.

What we claim is:

1. An inner burr and inner surface cleaning apparatus for pipes of medium and small diameters comprising:
   a base;
   a carriage mounted on the base and reciprocable along a long pressure-welded pipe of medium and small diameters having an inner burr produced on an inner face thereof;
   a supporting tube inserted into the pressure-welded pipe and having two ends, one end being supported by the carriage;
   first drive means mounted on the carriage;
   a hollow cylindrical rotary shaft having two ends and passing through the supporting tube with one end protruding from said other end of the supporting tube and rotated at the other end thereof by the first drive means;
   inner burr cutting means fixedly mounted on the rotary shaft for cutting off the inner burr;
   sets of guide rollers, each of said sets being arranged circumferentially on an outer periphery of the supporting tube for contacting the inner face of the pressure-welded pipe;
   centering means disposed at the other end of the supporting tube for centering the inner burr cutting means in the pressure-welded pipe;
   second drive means mounted on the centering means;
   spatter crushing means disposed adjacent to the second drive means and rotated thereby for crushing spatters produced in the pressure-welded pipe, said spatter crushing means having two ends, one end being nearer to the carriage and the other end being more remote therefrom;
   electromagnetic means disposed at one of said two ends of the crushing means for attracting chips and spatters in the pressure-welded pipe;
   spattering prevention means disposed between the inner burr cutting means and said one end of the supporting tube;
   a paint spraying device disposed at an end of the apparatus which is remote from the carriage for spraying paint on the inner face of the pressure-welded pipe; and
   a cooling device surrounding pressure-welded portions of the pressure-welded pipe for cooling said pressure-welded portions.

2. The apparatus according to claim 1, wherein the paint spraying device comprises:
   a cylindrical paint sprayer head;
   a nozzle provided in a central portion of the sprayer head, said nozzle having an orifice; and
   a connection pipe having two ends, one end being connected to the nozzle and the other end being connected to a high pressure paint-feeding device.

3. The apparatus according to claim 2, wherein said paint spraying device includes an elastic uninflammable screen located between the paint sprayer head and the electromagnet means.

4. The apparatus according to claim 3, wherein said screen is a disc member which is made of glass wool and whose outer diameter is larger than the inner diameter of the pressure-welded pipe.

5. The apparatus according to any one of claims 1 to 4, wherein said cooling device comprises;
   a housing having openings through which the pressure-welded pipe passes;
   a plurality of ring shaped cooling pipes provided in the housing to surround the pressure-welded pipe;
   a plurality of cooling water spray nozzles mounted on the inner walls of the ring shaped cooling pipes; and
   a cooling water feed pipe communicating with the ring-shaped cooling pipes to supply high pressure cooling water thereto.

6. The apparatus according to claim 5, wherein said cooling device comprises a pair of water buffle boards for closing the corresponding openings of the housing through which the pressure-welded pipe passes.

7. The apparatus according to claim 6, wherein each of said water baffle boards comprises an elastic ring member whose inner diameter is smaller than the outer diameter of the pressure-welded pipe and which is provided with a large number of fins defined by many notches radially extending from the inner peripheral edge of the ring member.

* * * * *